United States Patent [19]
Nelson

[11] 3,930,366
[45] Jan. 6, 1976

[54] HELICOPTER POWER PLANT CONTROL
[75] Inventor: Robert E. Nelson, Indianapolis, Ind.
[73] Assignee: General Motors Corporation, Detroit, Mich.
[22] Filed: July 17, 1974
[21] Appl. No.: 489,263

[52] U.S. Cl. .......................... 60/39.15; 60/39.28 R
[51] Int. Cl.² .......................................... F02C 9/08
[58] Field of Search. 60/224, 39.15, 39.16, 39.28 R; 290/4 R, 40 R

[56] References Cited
UNITED STATES PATENTS

| | | | |
|---|---|---|---|
| 3,159,000 | 12/1964 | McCombs | 60/39.16 |
| 3,174,284 | 3/1965 | McCarthy | 60/39.15 |
| 3,533,236 | 10/1970 | Cottington | 60/39.28 R |

*Primary Examiner*—C. J. Husar
*Assistant Examiner*—Robert E. Garrett
*Attorney, Agent, or Firm*—Paul Fitzpatrick

[57] ABSTRACT

A control system for a helicopter power plant with three power units driving the lifting rotor system through a main gearbox. Each power unit comprises a gas turbine engine of the gas-coupled type, a hydromechanical fuel control receiving electrical inputs to set a gas generator governor in the fuel control, an engine electronic control, and various engine accessories.

The operation of the power plant is normally controlled by the pilot through condition levers and switches on a control quadrant, through a pitch control by which the collective pitch of the rotor blades is controlled, and through a master beeper switch which is operable to trim the setting of an isochronous governor for the rotor system and the gas generator governors. The condition lever of each engine transmits a speed command signal through the electronic control of each power unit to its gas generator governor. A signal of collective pitch transmitted from the rotor control system to each engine electronic control is another factor in setting the governor.

The power plant includes a power management control, the principal function of which is to equalize the power outputs of the engines. It also includes the rotor isochronous governor. The power management control receives inputs of rotor system speed command and actual rotor speed and of the torques of the individual engines and transmits a governor trim signal to increase or decrease engine power to the several electronic controls.

All signals are transmitted electrically between the rotor system, control panel, power management control, and engine electronic controls. Excessive engine torque during rotor startup is avoided.

10 Claims, 8 Drawing Figures

HELICOPTER POWER PLANT CONTROL

INTRODUCTION

The invention described herein was made in the course of work under a contract with the Department of Defense.

This invention relates particularly to controls for a helicopter power plant embodying a plural number of gas turbine engines. However, many features of the control system may be employed in other environments. The system provides an overall control of the operation of the several engines, coordinating the engines with the operation of the lifting rotor or rotors of the aircraft and with signals transmitted by the aircraft pilot. It provides for division of the load between individual engines, for safety overrides or shutdowns in the event of a casualty, for alternative modes of operation in the event of failure of some portion of the system, and particularly for electrical transmission of signals between various elements of the system which are located at diverse points in the aircraft. This use of electrical interconnections or "fly-by-wire", as opposed to mechanical rigging or hydraulic controls, for example, reduces weight and increases reliability of the power plant besides facilitating installation.

The principle object of the present invention is to improve controls for a multiple engine installation, particularly in helicopter installations powered by gas turbine engines; a more particular object of this invention is to provide improved power management controls to increase safety and flexibility of a multi-engined plant for a helicopter and particularly improve rotor startup and response to engine failures; also, to provide alternative modes of control.

The nature of the invention and its advantages will be clearly apparent to those skilled in the art from the succeeding detailed description of the preferred embodiment of the invention, the accompanying drawings thereof, and the appended claims.

Referring to the drawings.

Figure 1:
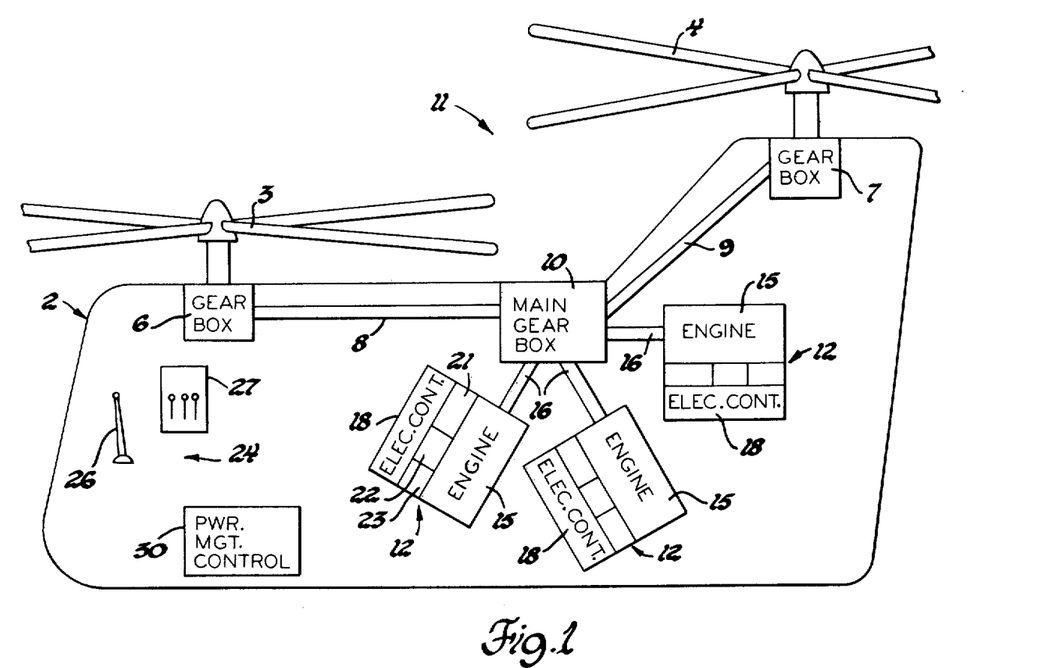
FIG. 1 is a much simplified illustration of a gas turbine powered helicopter.

Referring first to FIG. 1, this illustrates a helicopter installation to which the control system of the invention is applicable. This is a highly schematic diagram for orientation, and is not intended as a full description of the actual aircraft installation.

The particular installation for which this control is provided has been described more fully in a paper by J. Roger Alwang and Richard D. McLain entitled "Heavy-Lift Helicopter Engine Control System" presented at the 30th Annual National Forum of the American Helicopter Society in Washington, D.C., May 1974 (preprint No. 870). McCarthy U.S. Pat. No. 3,174,284, Mar. 22, 1965, may also be of interest as to helicopter engine controls.

FIG. 1 illustrates the aircraft so far as is necessary to an understanding of the control system of this invention. A helicopter 2 is of the type having a forward lifting rotor 3 and an aft lifting rotor 4. Rotor 3 is driven through a gearbox 6 and rotor 4 through a gearbox 7. These gearboxes are connected by shafts 8 and 9, respectively, to a main or combiner gearbox 10. The rotors, gearboxes, and shafts are termed the rotor system 11.

Power is supplied to the main gearbox by three power units 12, each of which includes a gas turbine engine 15 delivering power through a shaft 16 to the main gearbox. Each power unit includes also an engine electronic control 18 and various controls and accessories such as a fuel control 21, a compressor variable geometry actuator 22, and a starter 23. Each engine is of the gas-coupled or free turbine type. This means that it includes a gas generator comprising a compressor, combustion apparatus, and a turbine, and a power turbine energized by the discharge from the gas generator. The gas generator turbine and the power output turbine rotate independently, the latter driving the shaft 16. The shafts 16 are suitably geared together and to the rotor drive shafts 8 and 9 in the gearbox 10. An overrunning clutch (not illustrated) is provided between each shaft 16 and the common drive so that the rotor may not be braked by a casualty to an individual engine. Normally, however, the power turbines rotate synchronously as geared together through a main gearing in the box 10.

The aircraft includes a pilot's station at 24 with controls for the aircraft including a stick 26 by which the collective and cyclic pitch settings of the lifting rotor blades and controlled, as is well known. The pilot's station also includes an engine control quadrant or control panel 27 which bears a main control lever called a condition lever for each power unit, as well as other controls and switches to be described.

The other major element of the control system is a power management control 30 which has various functions in the coordination of the operation of the power units, to be described. The electronic controls, power management control, and the control quadrant are connected together only by electric wiring (not illustrated in FIG. 1), as will be further described.

The details of the rotor system are immaterial to the present invention, which is equally applicable to a single rotor helicopter, or to other power plants having control requirements comparable to that illlustrated.

General Description

Figure 3:
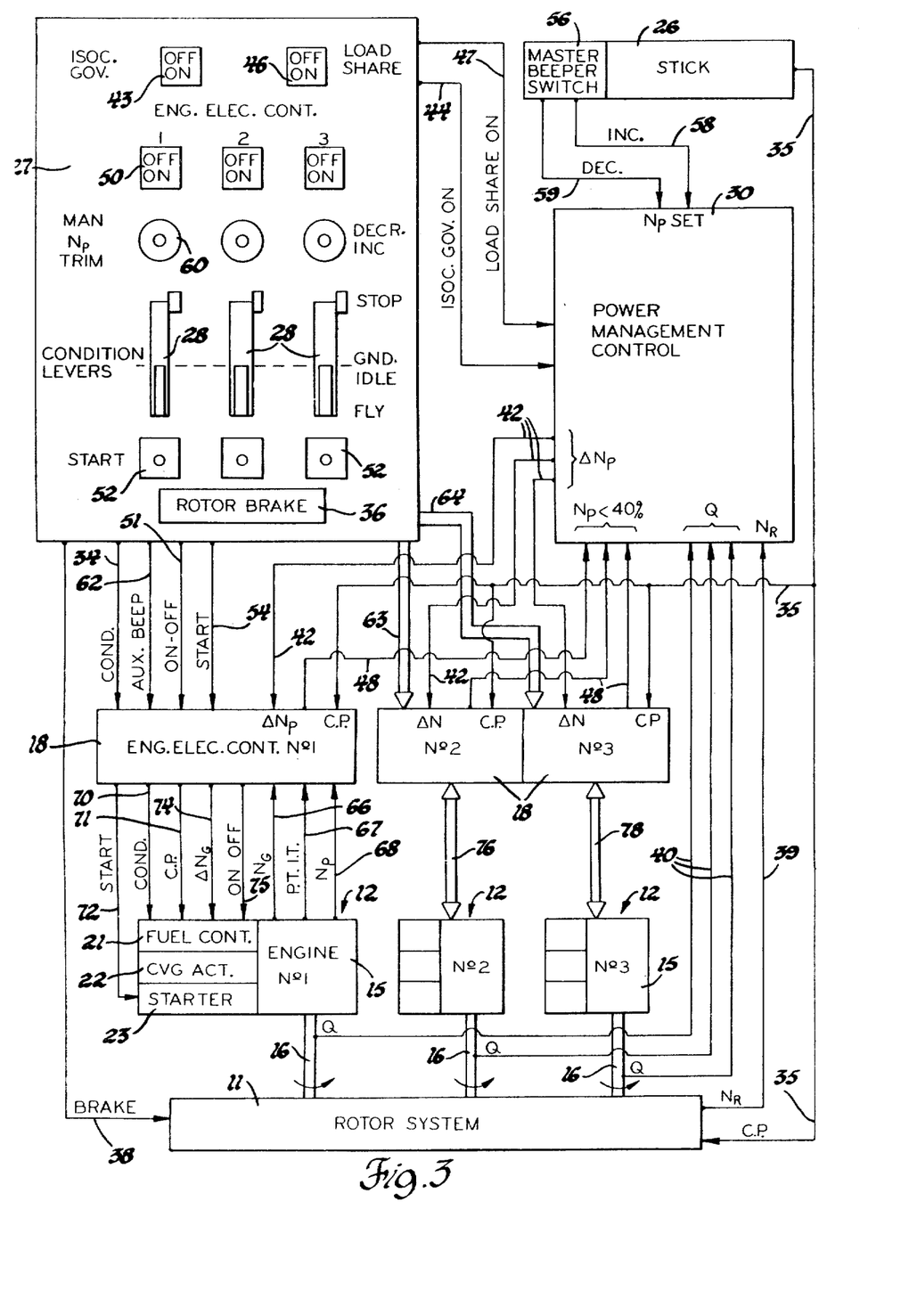
FIG. 3 is a general diagram of the overall power plant control system of the helicopter.

The nature of the interconnections between the major elements of the control system is set out in the system diagram of FIG. 3. It will be noted that the rotor system 11, power plants 12 including the component engines 15, engine electronic controls 18, fuel controls 21, compressor variable geometry actuators 22, and starters 23, are illustrated toward the bottom of the drawing. The control quadrant 27, pitch control stick 26, and power management control are illustrated in the upper part of the figure. As indicated, the control quadrant bears three condition lever 28 which are movable from a Stop position to a Ground Idle or Start position at which the engine may be started and operated at minimum power, and further to a Fly or maximum power position at the other end of the range of movement. Engine power may be modulated between the Ground Idle and Fly positions, depending upon the movement of the lever in the quadrant.

The position of the condition lever is transmitted as an electrical signal to the engines electronic control through a line 34. An electrical signal representing collective pitch of the rotors is transmitted by a suitable transducer from the control stick 26, automatic flight control, or other source, through a line 35 to each engine electronic control; and to the rotor system 11 to set rotor collective pitch. Other transmission means to the rotor may be employed and other means of controlling rotor pitch may be employed, but the point with which the control system is concerned is that an electrical signal representing collective pitch is supplied to each engine electronic control.

The control quadrant 27 mounts a rotor brake control 36 which is connected as indicated by line 38 to the rotor drive system to hold the rotor against rotation until the brake is released. There is an interlock to prevent movement of any condition lever beyond the Ground Idle until the brake is released. Line 39 represents means for transmission of a lifting rotor speed signal, specifically an alternating current the frequency of which is proportional to speed, to the power management control 30. The power management control uses the rorot speed signal as the input to isochronous governing means which establishes the final control of rotor and power turbine speed. A signal representing torque transmitted through the power output shaft of each engine is communicated to the power management control through transmission systems identified as 40. These signals are converted into potentials representing the torque output of each engine in the power management control. The rotor speed and engine torque signals are used to generate a power turbine governor trim signal, indicated as $\Delta N_P$, for each engine. These are transmitted through lines 42 to the respective electronic controls 18. The rotor isochronous governor is normally on but may be turned off by a switch 43 on the control quadrant connected through a line 44 to the power management control. Likewise, the load sharing features of the power management control are normally on, buy may be turned off by a switch 46 on the quadrant connected through a line 47 to the power management control. Operation of each torquemeter circuit is inhibited below 40% normal rated power turbine speed by a signal transmitted through a line 48 from each of the engine electronic signal controls.

Each engine electronic control 18 is turned on by its respective switch 50 on the quadrant connected through a line 51 to the control. Teh control quadrant als mounts a Start switch 52 for each engine connected through a line 54 to the electronic control to turn on the starter. The starter is cut out by movement of the condition lever to Stop.

The system also includes means for varying rotor speed over a limited range from its normal value by operation of a master beeper switch 56 mounted on the control stick 26. The master beeper switch includes a switch member which is movable in either direction to cause an increase or decrease in rotor speed command. The switch is connected through the lines 58 and 59 marked "increase" and "decrease" to the power management control. The signal from the beeper switch is converted to a signal compatible with those generated to balance power output between the engines, and added to these signals to contribute to the $\Delta N_P$ governor trim signals transmitted through lines 42 to the several engine electronic controls.

There is also an auxiliary beeper or manual $N_P$ trim system by which any individual engine may be trimmed slightly in governor setting under certain conditions. The auxiliary beeper system includes a switch 60 on the control quadrant for each power unit which transmits a signal through lines 62 to the electronic control.

The broad arrows 63 and 64 on FIG. 3 represent transmission of signals to the No. 2 and No. 3 engine electronic controls corresponding to those transmitted to the No. 1 electronic control.

Each engine electronic control 18 receives signals from the stick 26 or other collective pitch control, the control quadrant 27, and the power management control 30 for control of the corresponding engine. It also transmits a signal of power turbine speed below 40 percent to the engine electronic control. It receives electrical signals of gas generator turbine speed, power turbine inlet temperature, and power turbine speed from the engine as indicated by arrows 66, 67, and 68. The engine electronic control transmits a current signal indicative of condition lever position over a line 70 and a current signal over line 71 indicative of collective pitch. The starter, geared to the gas generator, is energized from the electronic control through a line 72. The governor trim signal indicated by $\angle N_G$ is transmitted through line 74 to the governor trim of the fuel control. This is a reversable current signal. On-off electrical signals for fuel shutoff valve control are transmitted through lines 75 to the fuel control.

The fuel control, which is mounted on the engine, receives inputs of gas generator rpm, engine inlet temperature, and compressor discharge pressure directly from the engine, and is driven by the engine. The compressor variable geometry actuator regulated by the fuel control acts to vary the setting of vanes in the engine compressor.

The broad arrows 76 and 78 represent transmissions between power units Nos. 2 and 3 and their electronic controls corresponding to those indicated specifically for power unit No. 1.

It may be reiterated that all of the communications between the elements indicated by the arrows in the diagram of FIG. 3 are by electric potentials or currents and, therefore, may be transmitted by suitable wiring.

Figure 4:
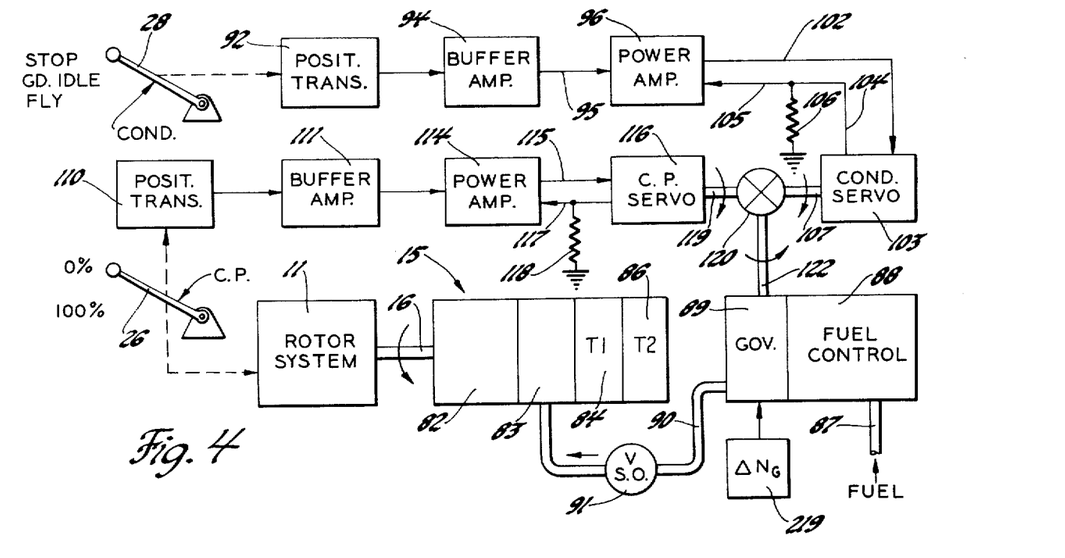
FIg. 4 is a schematic diagram of circuits for remote setting of the engine governor.

Getting now into the relation of the hydromechanical fuel controls to the engines, we refer first to FIG. 4 which illustrates any one of the gas turbines 15 as comprising in flow series a compressor 82, combustion apparatus 83, a high pressure turbine 84 indicated as T1, and a low pressure turbine 86 indicated as T2. The high pressure turbine drives the compressor and the low pressure turbine 86, otherwise called the power turbine, drives the power output shaft 16 which extends through the gas generator comprising elements 82, 83, and 84. As with gas turbine engines in general, the basic control of the engine is by control of the supply of fuel. Fuel is delivered by an engine driven pump (not illustrated) through conduit 87, to the engine fuel control 88. The fuel control includes, among other instrumentalities, a governor 89 driven by the gas generator turbine 84 of the engine. The fuel control contains suitable provisions for determining the amount of fuel allowed to flow to the engine for steady state operation, acceleration, and deceleration, and for returning the excess to the pump inlet by conventional means (not illustrated). The fuel control 88 discharges fuel through a metered fuel line 90 in which is interposed a fuel shutoff valve 91. Valve 91 is opened when it is desired to initiate combustion during starting of the engine and remains open as long as the engine is operating.

We do not attempt here to describe the fuel control in detail, since such details are immaterial to the present invention. A great number of fuel control devices which may be used for the purposes of the present invention are known. The particular control 88 employed in practice of the present invention is manufactured by the Woodward Governor Company of Rockford, Illinois. Some insight into the structure of such engine governors may be had, if desired, from consideration of the following U.S. Pat. Nos.: Plummer No. 3,426,777, Feb. 11, 1969; Barnes U.S. Pat. No. 3,442,277, May 6, 1969; and Witt U.S. Pat. No. 3,772,884, Nov. 20, 1973. As with most fuel controls for a gas-coupled gas turbine engine, this device includes a governor rotated by the gas generator turbine which controls a fuel metering valve. The basic speed setting of this gevernor is determined by an input which loads the speeder spring of the governor. It is also responsive to a second loading which we may call a governor trim or $\Delta N_G$ signal.

The setting of the speeder spring of the governor 89 is effected through servo systems responsive to the settings of the condition lever 28 of the particular engine and the collective pitch lever of stick 26 which is connected to all of the fuel controls. As illustrated in FIG. 4, the condition lever 28 is connected to a position transducer 92 which transmits an electrical potential signal representing position of the condition lever to a buffer amplifier 94 which transmits a potential signal through line 95 to a power amplifier 96. The position transducer is a commercially available type device which generates a signal that is a predetermined function of the position of the condition lever. One example of such a device is a potentiometer, but more sophisticated devices such as linear-variable differential transformers are preferred. This may be coupled to the condition lever through a non-linear motion transmission linkage.

The power amplifier responds to the potential signal to generate a current which varies with condition lever position. The current is fed through a power lead 102 to a condition lever servo 103 and the current returns to ground through a line 104 and a low resistor 106. The condition lever servo is a torque motor type device which rotates an output shaft 107 proportionally to the current supplied to the motor. A potential proportional to the value of servo current is fed back to the power amplifier through a branch 105 of line 104.

The collective pitch stick 26 is connected through a position transducer 110 and buffer amplifier 111 to a power amplifier 114. The potential signal fed to power amplifier 114 causes transmission of a corresponding current signal through line 115 to a collective pitch servo 116. Current is returned to ground through line 117 and low resistor 118. The potential drop across the resistor provides a feedback of current value to the power amplifier through a branch of line 117. The collective pitch servo also is a torque motor type device which rotates its output shaft 119 as a direct function of collective pitch of the helicopter rotor. Rotations of the shafts 107 and 119 are added in a mechanical differential gear 120 which rotates a shaft 122 entering the fuel control 88 and coupled through suitable mechanism to the speeder spring of the gas generator turbine governor. It will thus be seen that the setting of this governor is a function of the position of the condition lever and of rotor collective pitch.

Figure 2:
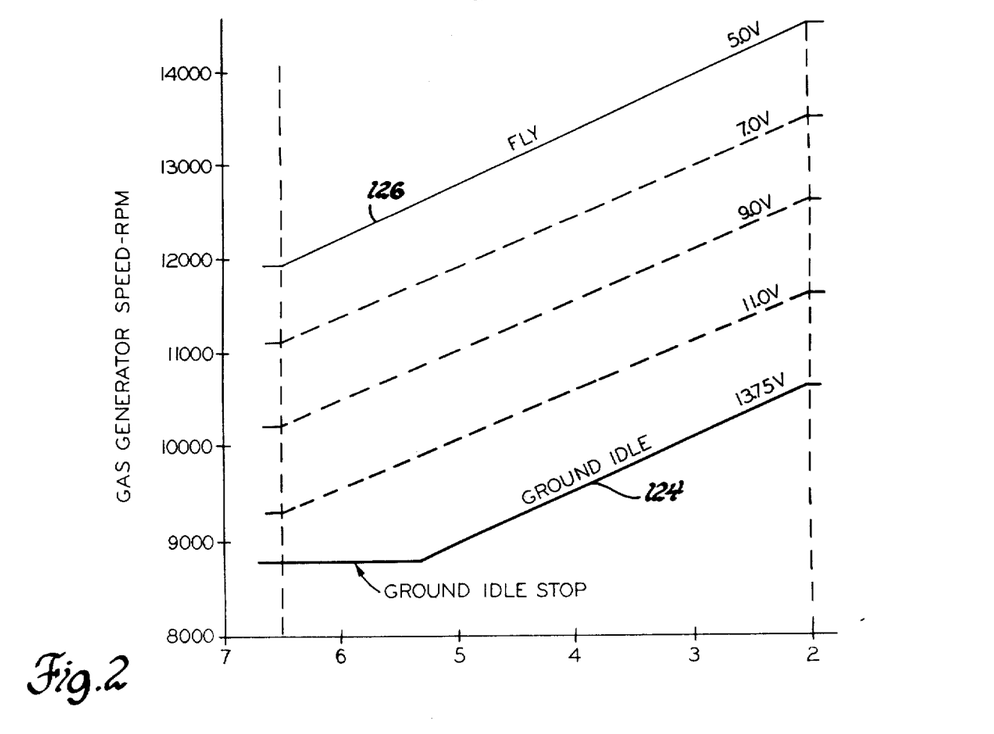
FIG. 2 is a chart illustrating the effect on gas generator governor speed setting of condition lever and collective pitch inputs.

The effects of the collective pitch and condition inputs to the fuel control are shown in FIG. 2. This is a plot of gas generator speed as a function of collective pitch input and the condition lever input. The condition lever input is represented by a family of lines, the lowest line 124 of which is identified as "Ground Idle" and the uppermost 126 as "Fly". The collective pitch input from transducer 110 and buffer amplifier 111 varies over a range from 6½ volts for minimum pitch down to 2 volts for maximum pitch. The input from the condition lever transducer 92 and buffer amplifier 94 varies from 13.75 volts with the condition lever at ground idle position down to 5 volts with the condition lever at the maximum or Fly position. Thus, gas generator governor setting is increased as the condition lever is moved from Ground Idle toward the Fly position and as the collective pitch lever is moved from flat pitch toward maximum pitch. The input from the collective pitch lever anticipates and approximately compensates for the load added to or subtracted from the engine by changes in rotor pitch. The condition lever input normally is set to Fly; that is, to call for maximum condition lever speed input, and the speed is then trimmed by other instrumentalities. However, the condition lever may be used as a means to control the power output of the engine between Ground Idle and Fly by movement of the condition lever. The minimum gas generator speed setting is approximately 8800 rpm in this particular case as determined by a fuel metering valve minimum flow stop. Of course, the values of speed and voltage set out are merely those selected for this particular engine and aircraft installation, and might be different for other cases. If is considered highly desirable, however, to have the control potential decreased for increasing rotor pitch and for increasing power setting of the condition lever, since this results in a fail-safe condition where interruption of power in the electrical system tends to produce maximum power from any engine, and maximum rotor pitch. If not corrected in other element of the system, as later described, the pilot may correct any error.

Power Management Control

Figure 7:
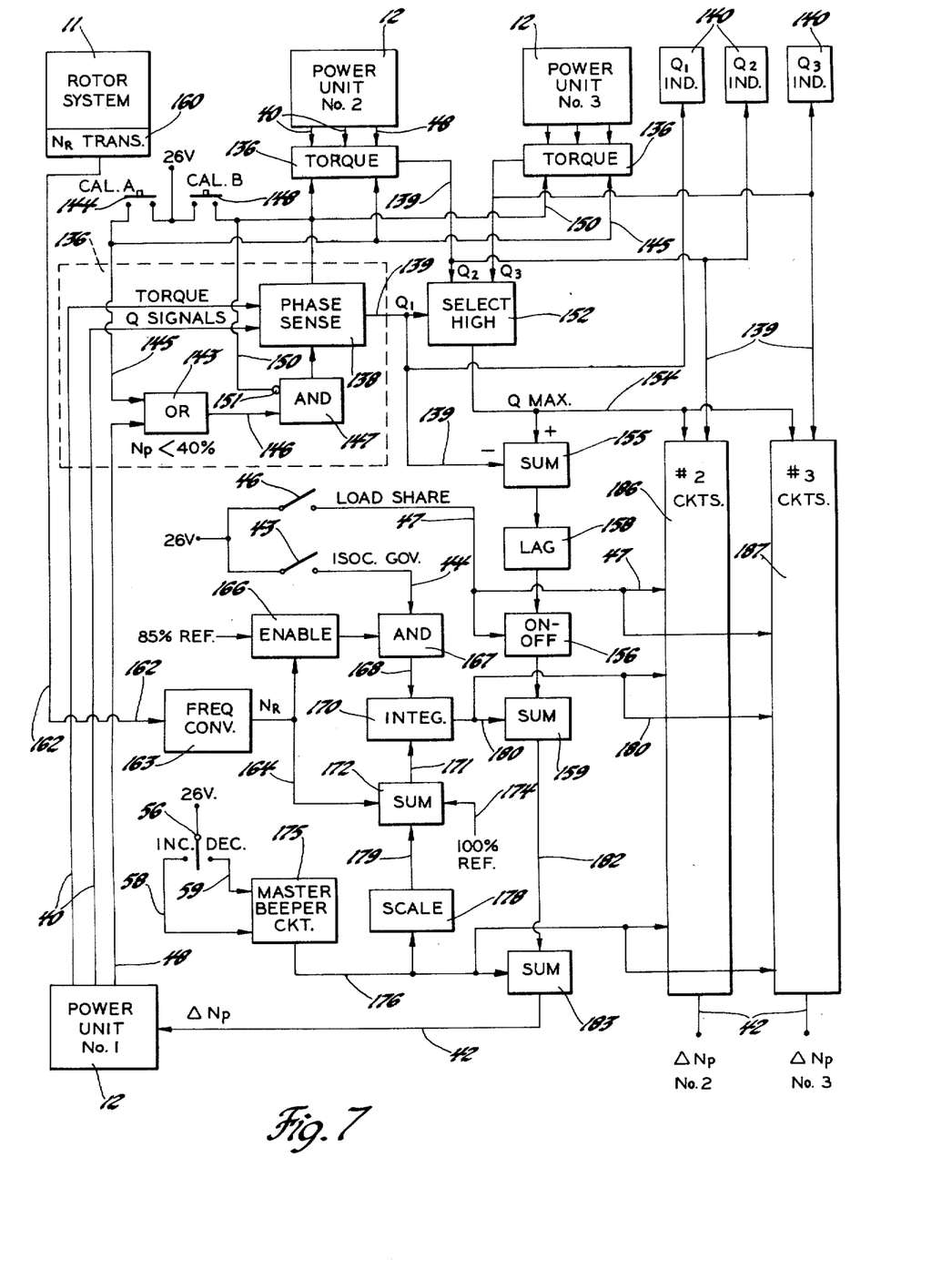
FIG. 7 is a schematic diagram of the power management control portion of the control.
Figure 8:
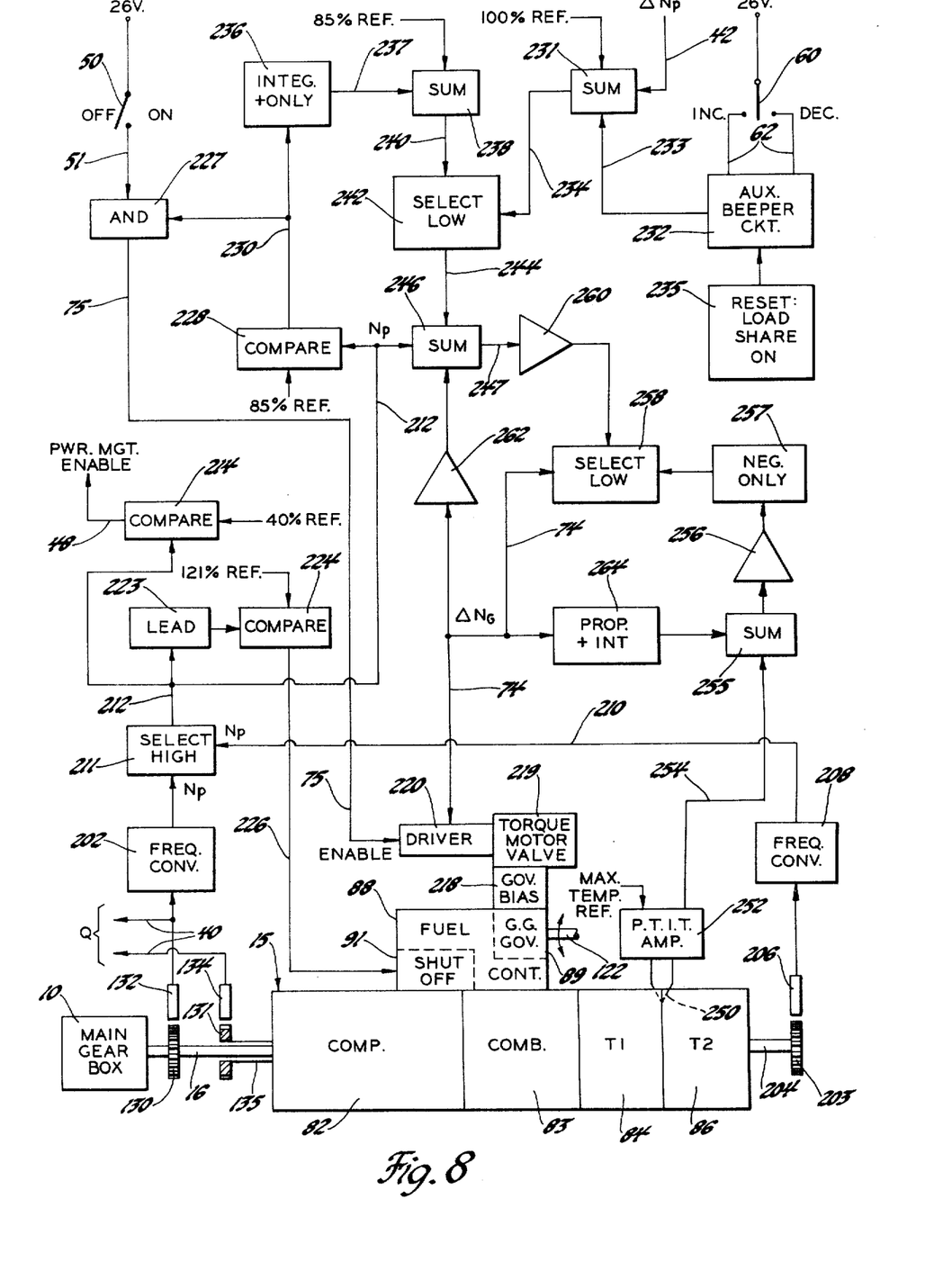
FIG. 8 is a schematic diagram of the engine electronic control for each engine.

We may now take up the power management control system which, as stated above, receives inputs of rotor speed command from the master beeper switch, rotor speed, torque, of each engine, and power turbine speed below 40 percent from each power unit. It delivers a power turbine speed trim signal to each engine electronic control. Referring first briefly to FIG. 8 for the origin of the engine torque signals, an engine 15 is illustrated at the bottom of the figure. The power output shaft 16 from the turbine 86 enters the main gearbox 10 of the rotor system along with the output shafts of the other engines. A toothed wheel 130 is mounted on the shaft 16, which is twisted proportionally to the torque delivered by it. A similar toothed wheel 131 is mounted adjacent wheel 130 on a reference shaft 135, which is unloaded. Inductive pickups 132 and 134 adjacent the wheels generate alternating current signals responsive to the rotation of the wheels. The value of torque is represented by the phase difference of the alternating current signals transmitted by the pickups 132 and 134. Specifically, in the particular case, the signals from the pickups are in phase at a particular negative (reverse torque) value of torque and become increasingly out of phase as torque value increases in the positive direction. The signals from these two conductive pickups are transmitted through the lines 40 (note also FIG. 3) to the torque measuring circuits 136 (FIG. 7). The principle element of each torque measuring circuit 136 is a phase sensing circuit 138 which provides a potential output on line 139 which is a linear function of torque. Specifically in the described example, the output is zero volts at minus 500 lb.-ft. torque and rises linearly to 10 volts at 5500 lb.-ft. The signal is transmitted through line 139 to elements of the power management control and also to a pilot's torque indicator 140 for the particular engine.

There is no need to describe specific torque transducers and phase sensing circuits to explain the present invention. Tyler et al. U.S. Pat. No. 2,766,617, Oct. 16, 1956, discloses structure for providing signals indicative of torque such as might be used in the present system. The preferred phase sensing circuit is irrelevant to the present invention, being the invention of another. However, one of many known phase sensing circuits may be used in this combination.

The torque measuring circuits include means for blocking their operation when power turbine speed is below 40 percent of full rated. Passing over for the time being the means for deriving a signal indicative of power turbine speed, which is a part of the engine electronic control, the power unit transmits on a line 48 a positive signal when power turbine speed of the power unit is less than 40 percent rated. This signal is transmitted to an OR gate 143. The other input to OR gate 143 is from a calibrating switch 144 marked "Cal. A" which connects the 26 volt supply to the gate. Thus, if either the speed is below 40 percent or switch 144 is closed, there will be an output on line 146 from the OR gate to an AND gate 147. The AND gate also receives an input from the 26 volt supply through a second calibrating switch 148 identified as "Cal. B". This signal is transmitted through a line 150 and an inverter 151 to the other input of AND gate 147.

When power turbine speed is below 40 percent rated or the calibration switch 144 is closed, the OR gate 143 provides an output on line 146 into the AND gate 147. These is also an input through inverter 151 when calibration switch 148 is not closed. In this case, the AND gate is operative to transmit a signal to the phase sensing circuit which causes the phase sensing circuit to read a very low torque value, specifically minus 254 lb.-ft., regardless of any actual torque signal. If the indicator 140 reads a different value, there is an adjustment to set this initial point of the torquemeter scale. Closing of the other calibration switch 148 transmits a signal through line 150 and inverter 151 to inhibit transmission of any signal through AND gate 147. The calibration B input is supplied through line 150 to each phase sensing circuit and should cause an artificial high reading, specifically 5281 lb.-ft. A second adjustment of the phase sensing circuit is provided to change the slope of the output to match this value, so that with the two points correctly set the torquemeter output will follow the desired linear relation to torque and indicate or control accurately.

Thus, when the calibration switches are in their normally open condition and power turbine speed rises to a level over 40 percent, each torque circuit 136 supplies a potential on its output line 139 representing the torque output of the particular power turbine. These outputs are fed to a select high gate 152 which provides an output on line 154 of maximum torque, indicated as $Q_{max}$. In the particular embodiment, this is a negative signal which becomes more negative with increase in torque.

Considering now specifically the power management circuits for power unit No. 1, the maximum torque signal on line 154 and the engine No. 1 torque signal on line 139 are fed to a summing circuit 155. If engine No. 1 is the one with the highest torque, these two inputs balance out and effective output is zero. If the engine No. 1 is not that having the highest torque output, the summing circuit puts out a difference signal of the difference between engine No. 1 torque and the highest torque. This signal, which has been inverted and is positive, is supplied to an On-Off gate 156. Lag is introduced by a lag circuit 158. In practice, the lag may be introduced in the same circuit as the accomplishment of the summing. In other words, 155 and 158 may be embodied in a single operational amplifier circuit with inputs of maximum torque and engine torque through suitable resistance and a capacitive feedback from the output of the operational amplifier. The On-Off gate allows the signal calling for torque increasing correction of engine power output to proceed to a summing circuit 159 is load sharing is turned on at the switch 46 on the control quadrant 27. When this switch is closed it transmits 26 volts to the On-Off gate 156.

The summing circuit 159 adds in a speed correcting signal from an isochronous governor responsive to rotor speed.

This brings us to a discussion of the rotor isochronous governor circuit. As illustrated in FIG. 7, the rotor system 11 includes a rotor speed transducer 160, which may be a toothed wheel and magnetic pickup, which generates an alternating emf the frequency of which is directly proportional to rotor speed. This transducer may be located in the main gearbox 10. Rotor speed transducer 160 is shown as connected through a line 162 to a frequency conversion circuit 163 which provides an output potential proportional to rotor speed on an $N_R$ line 164. Circuit 163 may be of any suitable type, including that disclosed in Nelson et al U.S. Pat. No. 3,482,396, Dec. 9, 1969. The $N_R$ signal is fed through line 164 to a gate 166 which receives a second input of emf corresponding to 85 percent rated rotor speed. When the $N_R$ signal is above the 85 percent point, gate 166 transmits an enabling signal to an AND gate 167. The other input to the AND gate 167 is from the isochronous governor enabling switch 43 on the control quadrant. Thus, if this switch is closed to enable the isochronous governing system and the rotor speed is above 85 percent, the AND gate transmits an enabling signal through line 168 to an integrating circuit 170. This circuit is provided to integrate the speed error of the rotor to provide isochronous governing. In addition to the enabling input, circuit 170 receives a rotor speed error signal through line 171.

The rotor speed error signal is developed in a summing circuit 172. This circuit receives an input of actual rotor speed from line 164, an input of a reference potential representing 100 percent rotor speed as indicated at 174, and a further input from a master beeper circuit. This is a circuit by which the set or desired speed of the rotor may be varied over a limited range. Specifically, in this preferred embodiment, from 90 percent to 104 percent of normal rated rotor speed. We will not consider the details of the beeper circuit here. It is the subject of a copending U.S. patent application of Robert E. Nelson, Ser. No. 489,262 filed July 17, 1974, of common ownership. The beeper is operated by the switch 56 (see also FIG. 3) on the pilot's control stick, which may be moved in either direction to supply 26 volt current to the increase line 58 or the decrease line 59 leading into the beeper circuit 175. If switch 56 is closed on the increase line, the beeper circuit provides a progressively increasing outtput on its output line 176 to the maximum which calls for a 4 percent increase in rotor speed setting. If switch 56 is closed on the decrease contact, the rotor speed signal in line 176 decreases progressively to a value calling for rotor speed of 90 percent of normal rated. This signal is transmitted through a scaling circuit 178 to the input line 179 to the summing circuit 172.

The resulting output on line 171 is the error in rotor speed which results from the difference between the actual rotor speed, and the rotor speed set by the 100 percent reference plus the beeper circuit increment. This error signal is integrated in the integrating circuit 170 to provide the isochronous governing function, and the resulting speed correction signal feed through an isochronous governing signal line 180 to the summing circuit 159. Therefore, assuming that load sharing and isochronous governing are both turned on, summing circuit 159 derives the correction to engine power (gas generator speed responsive to rate of fuel supply) required to equalize engine torques and provide the desired or set rotor speed. This output is transmitted through a line 182 to a further summing circuit 183.

The rotor speed signal from beeper circuit 175 is also transmitted through line 176 to the summing device 183. The final output of governor trim signal on $\Delta N_P$ line 42 thus incorporates all of the inputs which should be reflected in a change of governor setting of the gas generator to effect even load division and the desired lifting rotor speed. The correction to equalize torques, the correction from the isochronous governor to eliminate variation in the rotor speed, and the input from the beeper circuit setting the desired rotor speed are summed and transmitted to the engine electronic control. The rotor isochronous governing and beeper circuit elements are common to all power units. The circuit elements 155, 158, 156, 159, and 183 are duplicated for each power unit. These elements for power units 2 and 3 are indicated schematically on FIG. 7 by the blocks 186 and 187.

Engine Electronic Control

FIG. 8 illustrates the basic engine electronic control configuration. We begin with a discussion of means for sensing speed of the power turbine. The engine 15 is illustrated as comprising the compressor 82 at the air inlet end, combustion apparatus 83, gas generator turbine 84, and power turbine 86. The power turbine drives the power output shaft 16 which extends through the forward end of the engine. Toothed wheel 130 and magnetic pickup 132 generate an alternating current the frequency of which is proportional to the speed of shaft 16. This signal is fed to a frequency conversion circuit 202 which provides an output potential proportional to the speed of shaft 16.

As a backup or safety device, a second power turbine speed signal is derived from a second toothed wheel 203 driven from the exhaust end portion 204 of the power turbine shaft. This wheel induces a signal in a pickup 206 which is transmitted to a frequency conversion circuit 208 which may be identical to the circuit 202 and which transmits a second output potential proportional to power turbine speed through a line 210. The details of the frequency conversion circuits 202 and 206 are immaterial to the present invention. They may, for example, be of the type disclosed in Nelson et al. U.S. Pat. No. 3,482,396, Dec. 9, 1969.

Normally, the signals from the circuits 202 and 206 are equal. However, in the event of failure of one of the frequency conversion circuits, the signal from the other is employed. The two signal outputs are fed to a select high circuit 211 which transmits the higher of the two signals to a number of elements of the system through a line 212. The presence of the two speed pickups provides a safety factor apart from possible electronic faliures, since the pickup 206 will respond to power turbine overspeed resulting from a broken shaft within the engine which would not be detected by the pickup 132.

One branch of power turbine speed signal line 212 is connected into a comparison circuit 214 which receives a reference emf equal to the potential generated in response to 40 percent rated power turbine speed, and provides a 26 volt power management enabling signal on line 48 when power turbine speed is below 40 percent. The disappearance of this signal from the OR gate 143 (FIG. 7) enables the torque signals from the engines to be transmitted to the load sharing system described above.

At this point, we consider briefly the fuel control 88, already described to some extent with respect to the inputs of condition and collective pitch. The fuel control, which receives fuel from a suitable pump and meters the required quantity to the combustion apparatus of the engine, includes a fuel shutoff valve 91 and a gas generator governor 89 which receives an input for setting the governor through the shaft 122 from the collective pitch and condition servos as previously described. This gas generator governor 89 is also biased in either direction to increase or decrease gas generator speed within a predetermined range by a hydraulic servo indicated as a governor bias mechanism 218. The pressure and thereby force exerted by this piston is controlled by a torque motor valve 219, a commercially obtainable device which provides a fluid pressure which is a direct function of the current supplied to the torque motor valve 219. The current is supplied by a valve driver circuit 220 which responds to a potential signal indicating the desired increment or decrement of gas generator speed through the line 74 (see also Fig. 3).

The shutoff valve 91 is energized to shut off fuel to the engine whenever the speed and acceleration of the power turbine are as to indicate incipient runaway conditions. Cutting off fuel deenergizes the power turbine to prevent runaway. The circuit for this runs from the $N_P$ power turbine speed line 212 through a lead circuit 223 which adds an acceleration component to the speed signal so that the output from the lead circuit is proportional to power turbine speed, plus a constant times acceleration of the power turbine, which speeds up the valve closing action in case of rapid acceleration such as might occur with a broken power turbine shaft.

The overspeed signal from the lead circuit 223 is fed to a comparison circuit 224 where it is compared with a reference signal, which in this case preferably represents 121 percent rated power turbine speed. If the signal transmitted from circuit 223 is greater than the voltage corresponding to 121 percent speed, the circuit 224 energizes a line 226 which causes a solenoid mechanism to close valve 91.

The governing features of the engine electronic control are turned on and off by a switch 50 on the control quadrant which supplies 26 volt power to the engine electronic control through a line 51. This signal is supplied to an enabling circuit for the valve driver amplifier 220 through an AND gate 227 and line 75. This signal is transmitted only if the AND gate is also energized by a signal indicating power turbine speed above 85 percent. This assures that there is no governor trim until power turbine and lifting rotor speeds reach 85 percent. The enabling signal is derived from the power turbine speed signal in line 212 by a comparison circuit 228 which receives also a reference voltage input corresponding to the 85 percent $N_P$ signal. The output of this comparison circuit is fed through line 230 to the AND gate 227. Unless switch 50 is closed and power turbine speed is above 85 percent, the governor trim is inoperative, because the driver circuits are not able to operate in response to the signal in line 74.

Proceeding to the origin of the gas generator governor trim signal, this may respond to a number of inputs; specifically, power turbine speed, the power turbine speed trim signal in line 42 from the power management control 30, a signal from a power turbine speed trim or auxiliary beeper circuit on the control quadrant, and a power turbine inlet temperature limit circuit. The generation of the power turbine trim signal in the power management control has been described above. This is fed through a line 42 for each engine into a summing circuit 231 which also receives an input potential representing 100 percent rated power turbine speed.

There is a further input from an auxiliary beeper circuit which is operable only when load sharing is turned off. For description of the system disclosed here, it is sufficient to point out that the Manual Trim Switch 60 on the control quadrant (FIG. 3) is operable to energize lines 62 leading to the auxiliary beeper circuit 232. When the increase line is energized the auxiliary beeper circuit provides a progressively increasing signal on its output line 233, and when the switch is closed on the decrease line, this signal is decreased. The power management trim signal or the auxiliary beeper trim signal is added in circuit 231 to the 100 percent reference signal to provide a component of the governor trim signal. This is fed through line 234 to a select low circuit 242. When load sharing is turned on, the auxiliary beeper is reset to zero by an input from reset 235.

A feature of the control is that, when the governor does become effective at 85 percent turbine speed, it controls so as to provide a desired limit to rate of increase of power turbine speed so that there is no sudden surge of power into the rotor system as the governing system becomes effective. The enabling signal from the comparison circuit 228 is fed above 85 percent power turbine speed through line 230 to an integrating circuit 236 which provides a gradually increasing signal, starting at zero when it is energized. This signal, which varies progressively from zero to substantially greater than the signal corresponding to 15 percent gas generator power turbine speed, is fed through a ramp signal line 237 to a summing circuit 238. Here the gradually increasing signal from integrator 236 is added to a potential corresponding to 85 percent power turbine speed. The result is a power turbine speed command signal on a line 240.

This signal starts at the value for 85 percent power turbine speed when the control is made operative and increases, preferably at a rate of about 3 percent rated gas turbine speed per second, to a value which is appreciably in excess of that for 100 percent power turbine speed. This signal is supplied to a select low gate 242. The other input to this gate is the power turbine speed control signal supplied by the summing network 231 through the line 234. The lower signal is selected and fed through line 244 to a summing circuit 246. By virtue of the action of the select low circuit, the increasing acceleration control signal on line 240 is effective only up to the point of equality with the normal control signal supplied over line 234. As the signal on line 240 increases beyond the value called for in line 234, which has a maximum of 104 percent rated, the signal on line 240 becomes ineffective after serving its purpose of controlling acceleration during initial speedup of the rotor system.

The summing circuit 246 receives also an input of actual power turbine speed from line 212, and an input of a gas generator governor trim signal, to be described. Leaving that aside for the moment, summing circuit 246 finds the difference between the power turbine output demand and actual power turbine output, and produces a corresponding signal on speed error line 247.

This signal is ultimately applied through the valve driver 220 to torque motor valve 219 to correct gas generator speed and thus engine power output. However, it is subject to override by an engine overtemperature signal. The engine is protected against overtemperature by a response to power turbine inlet temperature generated by thermocouples 250 in the engine. The potential generated by these thermocouples is proportional to temperature. This potential is amplified in a power turbine inlet temperature amplifier 252 which includes a temperature reference signal generating means to provide an emf representing the maximum allowable temperature. The amplifier 252 delivers a turbine temperature signal on line 254. This signal is negative in the normal temperature range and increases with temperature. At the established temperature limit the signal becomes positive and is increasingly positive as the overtemperature increases. This signal is summed with a feedback signal, to be described in a summing circuit 255. The resulting signal is amplified and inverted in a high gain amplifier 256 which delivers a signal which is normally highly positive but becomes highly negative during overtemperature. This signal is fed through a "Negative Only" gate 257, which passes only negative signals, to one of the inputs of a select low gate 258.

The other input of gate 258 is a response to overspeed which is generated by a high gain amplifier 260 energized by the signal in line 247 from the summing device 246. Amplifier 260 provides a positive input to the gate 258 except when the signal on line 247 indicates overspeed, in which case the signal becomes highly negative. Thus, if there is either an over-limit temperature or power turbine output greater than that called for, a negative signal is transmitted from the select low gate 258 to the valve driver amplifier through line 74. If temperature is below the established maximum and speed is below that called for by the signals added in summer 246, a positive signal is transmitted through line 74. A positive signal causes the driver to operate the torque motor valve to increase fuel, and a negative signal operates the driver to cause the valve to decrease fuel. As previously stated, this is effected by exerting a force on the governor-operated valve in the fuel control, effectively trimming the gas generator governor speed setting.

The valve driver signal on line 74 is fed back to the speed and temperature circuits. A proportional feedback of this signal is developed by an amplifier 262 which provides a damping input to the summing device 246. If the engine is under the selected speed and the summing device is ordering to the valve driver to increase fuel, the amplifier 262 provides a small negative input to the summing device to damp the input to the valve driver and prevent over-reaction and overtravel of the torque motor valve. There is also feedback to the summing device 255 which, in this case, includes an integrating term so that there is a lag in the feedback to the amplifier 256. This signal is generated in an integrating amplifier 264 which provides dynamic compensation for suitable transient performance.

This completes the description of the engine electronic control system, apart from start-stop controls, which are irrelevant to the subject matter claimed here. They form the subject matter of a patent application Nelson, Ser. No. 489,264 filed July 17, 1974, of common ownership.

Operation

While the operation of the power plant control system may well be clear to those skilled in the art from the foregoing detailed description, it seems best to discuss the operation and, in connection with this, to point out some of the characteristics of the control system more fully.

We may begin with the starting procedure, in which each engine is started independently. The isochronous governor, load share, and engine electronic controls may be energized through the switches on the control quadrant 27. The rotor brake is applied by the control 36 on the control quadrant. To start the engine, the corresponding condition lever is moved to Ground Idle (or to a Start position below Ground Idle if desired, but not above Ground Idle). The collective pitch control should be set to zero or flat pitch. If it is not, an interlock (described in companion application Ser. No. 489,264 signals the rotor to move to flat pitch until the condition lever is advanced above Ground Idle. The Start switch 52 for the engine is then closed. This energizes the starter through mechanism immaterial here. The engine goes through a starting cycle during which it is accelerated by the starter, the ignition is turned on and fuel is introduced, the engine then continuing to pick up speed until at some point the starter is cut out and the engine is in normal operation. As shown in FIG. 2, with the condition lever at Ground Idle, the gas generator will accelerate to a speed of about 8800 rpm. With the gas generator operating at this low speed, the torque delivered by the power turbine is relatively slight. Normally, after all of the engines are started, the condition levers are moved partially or all the way to the "Fly" position to call for a higher gas generator governor setting. This causes the gas generators to accelerate to the speed called for by the condition levers up to a maximum, in this case, of approximately 12,000 rpm. This greatly increases the power output of the power turbines.

In the particular aircraft, it is possible to overload the gearboxes if all three engines are putting out maximum torque at the same time under normal atmospheric conditions. Otherwise, the gearing would be unduly heavy. Under extremely hot conditions, the torque output is lower. On the other hand, in extremely cold weather, the torque available is greater. However, since the gas generator governors may not be moved to call for more than 12,000 gas generator rpm, the power available is limited to a reasonable value except in extreme conditions of cold weather, in which case the controls may not be moved all the way to the Fly position.

Also, the rotor may be damaged by excessive torque, particularly at low speed where the buckling effect of the torque transmitted from the rotor hub to the rotor blades is not sufficiently opposed by centrifugal force on the blades.

In this control system, the gas generator speed setting is held to the 80 percent value until the power turbines and rotor come up to 85 percent rated speed, and thereafter the system prevents a heavy surge of power when the power turbine governor is cut in.

This may be explained by reference to FIG. 5, which illustrates rotor starting characteristics at minimum collective pitch on a standard day. Total output torque of the three engines is plotted against rotor speed. The broken line 403 represents the torque output of the engines with the controls set at Ground Idle; that is, with the governors at the minimum setting and gas generators governed at about 8800 rpm. The torque decreases with rotor speed, since the torque of the power turbine decreases with speed for any given flow of motive fluid. The solid line 404 up to the 85 percent rotor speed point 406 represents the relation of power plant output torque to rotor speed as the rotor is being accelerated with the control in Fly, at approximately 12,000 gas generator rpm.

Assuming that the power turbine governor is set to call for 100 percent speed, it is held inoperative by the circuits described until 85 percent speed is reached at point 406. At this point the power turbine governor setting is advanced by the governor trim signal from 85 to 100 percent at a rate of approximately 3 percent per second. This gradual increase in governor setting prevents a too heavy surge of torque into the gearboxes and rotors. The torque increases, with the power turbine governor calling for more power by biasing the gas generator governor. Torque reaches a maximum value at the point 407 and then decreases as the rotor reaches the desired 100 percent speed. After a minor overspeed transient, the rotor system stabilizes at the point 408 which represents steadystate rotor speed and torque with the control set to Fly at minimum collective pitch. At this point the rotor system is in full speed operation, and if it is desired to lift the aircraft, the collective pitch is increased. With the increase in collective pitch, the gas generator governor setting is increased as indicated by the curve 126 in FIG. 2 to a maximum of about 14,400 at maximum collective pitch setting. The change in governor setting responsive to the collective pitch will generally parallel the increasing load as pitch is increased. If further trimming is required, it is accomplished by the governor trim system of the power management control. Normally, the trim effect is to reduce power.

Figure 5:
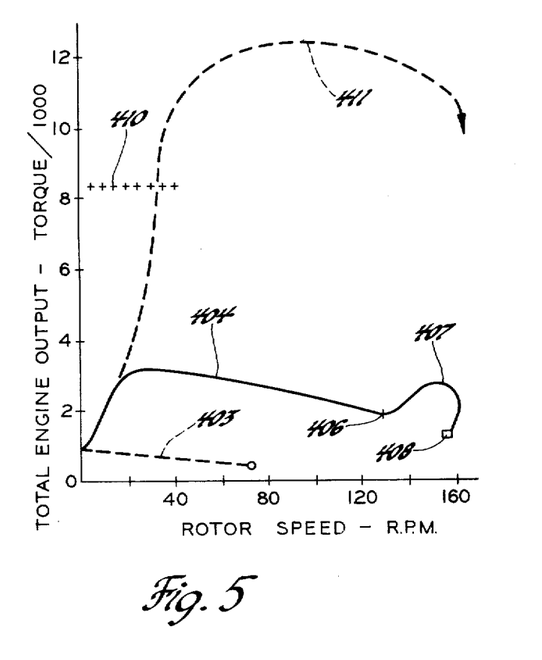
FIG. 5 illustrates rotor acceleration characteristics of the power plant.

Referring further to FIG. 5, the line 410 in the figure represents the steady state torque limit of the main gearbox. The broken line 411 represents the torque which would be delivered by the power plant if all three power units operated at maximum power setting or maximum gas generator governor speed setting to accelerate the rotor. This would be sufficient to overload the gearbox and possibly to damage the rotor system.

The normal 100 percent rotor speed is maintained unless there is some fault in the power plant or the pilot operates the beeper system to reset the isochronous governing system as previously described. This may be operated to vary rotor speed between 90 and 104 percent of normal rated speed.

The load sharing function of the control is normally in operation as described above to increase the fuel to any power plant which is delivering less torque than that delivered by the power plant delivering the greatest torque. Assuming that one power plant is capable of delivering a certain torque at a particular gas generator speed, whereas the others will require somewhat higher gas generator speed to provide the same torque, the governors of these others are trimmed to increase gas generator speed and equalize the torques. Such equalization does not normally change the rotor speed, since the rotor isochronous governor acts to reduce the torque of all the power plants concurrently to maintain the preset rotor speed.

Figure 6:
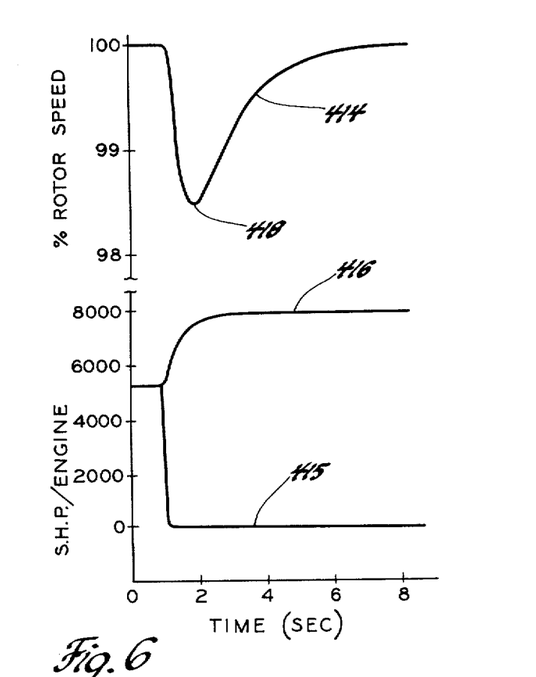
FIG. 6 shows calculated response of the system to failure of one engine.

The most important reason for having the load sharing feature in the control is to provide immediate proper reaction to failure of an engine. The design of the aircraft and power plant is such that under all normal conditions it is possible to maintain flight under full load with two power plants. The load sharing control quickly increases the output of the other two engines if one fails. This requires no attention from the pilot. Such action is illustrated by the curves in FIG. 6. These are plots of rotor speed and engine shaft horsepower against time. Curve 414 represents the rotor speed transient after a failure of one engine at one second time. Curve 415 represents the output of the failed engine. At one second time the torque output of the failed engine drops very rapidly to zero and remains zero. Curve 416 represents the output of each of the two good engines before and after the failure. With the loss of power, there is a drop in rotor speed of about 1½ percent during a time of about one more second to the minimum point 418. Rotor deceleration is resisted by the inertia of the rotor and by the output of the two operating engines. The rotor isochronous governor picks up the speed drop and acts through the power management control to increase the power turbine speed trim signal to all of the power units. This operates through the engine electronic control to increase the gas generator governor setting of all the engines. This does nothing for the failed unit, but it causes a rapid power increase from the two operating engines. The output of these rises from about 5300 horsepower each to about 8000 horsepower each in about 2 seconds. With this increase in power, the rotor again begins to accelerate and by the end of five seconds after the failure it is substantially at rated speed again.

In the event of partial failure of an engine, causing it to fail to deliver its full share of power, the load sharing control will increase the governor setting of the crippled engine up to the point where this increase is limited by the power turbine inlet temperature limit or by maximum gas generator speed (the latter being limited by the fuel control). However, the output of the properly operating engines is increased to take up the difference.

If a failure in the control should cause one power unit to go to maximum power, the power delivered by the other units is accordingly reduced by the rotor isochronous governor and the circuits described above. This condition may then be corrected by the pilot by movement of his condition lever to reduce the power setting of the engine which is accepting too much of the load.

If desired, the load sharing system may be turned off, in which case relative outputs of the engines may be adjusted by the condition levers or the governor settings may be adjusted by the auxiliary beepers. When the load share is turned off, the isochronous governor continues to contribute to the governor trim of the engine.

If the isochronous governor fails or does not operate properly, it may be cut out, in which case the rotor may be governed by the power unit governors as varied by the master beeper system or by the auxiliary beeper system to change the setting of the gas generator governors. The power plant may be operated with both load sharing and isochronous governing cut off.

The engine electronic control may be turned off at the switch 50 for any engine. In this case, the governor trim system is totally disabled. The gas generator governor still responds to condition lever position and collective pitch as described above.

Conclusion

It should be clear to those skilled in the art that the power management system described above is particularly adapted to respond authoritatively to failure or partial failure of an engine or to faults of one sort or another in the control system. It maintains rotor speed essentially constant notwithstanding loss of one power unit. It provides stand-by modes of control if any part of the power management or engine electronic control system is disabled. It balances output between the power units by bringing the other power units up to the level of the strongest. If this results in speed of the rotor greater than called for, the system as a whole is trimmed down, with the torques remaining balanced. Overloading of the rotor system during rotor acceleration is prevented. The system described acts to keep rotor speed variations within 3 percent notwithstanding full scale snap changes in collective pitch. The collective pitch input to the engine control minimizes the required electronic trim authority and improves control operation with the electronics off.

Preferably, the system described here is employed in connection with starting logic described in copending application Ser. No. 489,264 and with beeper circuits described in copending application Ser. No. 489,262, both referred to above.

It will be apparent that references to specific values in the specification are values which are considered most suitable for the particular installation described here and most, if not all, of these values are open to change where desired.

The system has been described in connection with a three-engine installation, but can obviously be modified for use with two, four, or more engines.

Also, it is applicable to power plants employing single-shaft gas turbine engines with some attendant simplification due to the single turbine in each engine. In the helicopter example cited, a disengageable clutch 3,930,366 between each power unit and the rotor system would be needed if single-shaft turbines were substituted for the free turbine type.

The detailed description of the preferred embodiment of the invention for the purpose of explaining the principles thereof is not to be considered as limiting or restricting the invention, since many modifications may be made by the exercise of skill in the art.

I claim:

1. A control system for a power plant including a plural number of gas turbine engines connected to drive a common variable load comprising, in combination, main power control means including a condition control settable by an operator providing a power output level command signal, a load control providing a power output required signal, a fuel control for each engine operative to control fuel flow to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, and means responsive to the power error signal of each engine coupled to the power trim means of the respective engine so as to increase the power output of each engine other than that generating the maximum power signal to eliminate the power error signal;

and governing means including means providing a load speed command signal, means responsive to load speed, means operative to provide a load speed error signal, and means responsive to the load speed error signal coupled to the power trim means of all engines so as to reset all the fuel controls in the direction to eliminate the load speed error signal.

2. A control system for a power plant including a plural number of gas turbine engines connected to drive a common variable load comprising, in combination, main power control means including a condition control settable by an operator providing a power output level command signal, a load control providing a power output required signal, a fuel control for each engine operative to control fuel flow to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, means responsive to the power error signal of each engine coupled to the power trim means of the respective engine so as to increase the power output of each engine other than that generating the maximum power signal to eliminate the power error signal, and means effective to disable the load sharing means below a predetermined engine speed level, and governing means including means providing a load speed command signal, means responsive to load speed, and means operative to provide a load speed error signal, means responsive to the load speed error signal coupled to the power trim means of all engines so as to reset all the fuel controls in the direction to eliminate the load speed error signal, and means effective to disable the governing means below a predetermined value of load speed.

3. A control system for a power plant including a plural number of gas turbine engines connected to drive a common variable load comprising, in combination, main power control means including a condition control settable by an operator providing a power output level command signal, a load control providing a power output required signal, a fuel control for each engine operative to control fuel flow to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, means responsive to the power error signal of each engine coupled to the power trim means of the respective engine so as to increase the power output of each engine other than that generating the maximum power signal to eliminate the power error signal, and optionally operable means effective to disable the load sharing means;

governing means including means providing a load speed command signal, means responsive to load speed, and means operative to provide a load speed error signal, means responsive to the load speed error signal coupled to the power trim means of all engines so as to reset all the fuel controls in the direction to eliminate the load speed error signal, and optionally operable means effective to disable the governing means;

and optionally operable means for each engine effective to disable the power trim means of the engine.

4. A control system for a power plant including a plural number of gas turbine engines connected to drive a common variable load comprising, in combination, main power control means including a condition control settable by an operator providing a power output level command signal, a load control providing a power output required signal, a fuel control for each engine operative to control fuel to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, means responsive to the power error signal of each engine coupled to the power trim means of the respective engine so as to increase the power output of each engine other than that generating the maximum power signal to eliminate the power error signal, means effective to disable the load sharing means below a predetermined engine speed level, and optionally operable means effective to disable the load sharing means;

governing means including means providing a load speed command signal, means responsive to load speed, and means operative to provide a load speed error signal, means responsive to the load speed error signal coupled to the power trim means of all engines so as to reset all the fuel controls in the direction to eliminate the load speed error signal, means effective to disable the governing means below a predetermined value of load speed, and optionally operable means effective to disable the governing means;

an optionally operable means for each engine effective to disable the power trim means of the engine.

6. A control system for a power plant including a plural number of gas-coupled gas turbine engines synchronously connected to drive a common variable load comprising, in combination, main power control means including a condition lever settable by an operator providing a power output level command signal, a load control lever settable by an operator providing a power output required signal, a gas generator governor for each engine operative to control fuel flow to the respective engine, and means generating a weighted sum of the said signals effective to vary concurrently the speed setting of the governors;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, governor trim means coupled to each governor effective to modify the speed setting of the governor, means responsive to the power error signal of each engine coupled to the governor trim means of the respective engine so as to reset governor of each engine other than that generating the maximum power signal in the direction to eliminate the power error signal, means effective to disable the load sharing means below a predetermined engine speed level, and optionally operable means effective to disable the load sharing means;

governing means including means providing a load speed command signal, means responsive to load speed, and means operative to provide a load speed error signal, means responsive to the load speed error signal coupled to the governor trim means of all engines so as to reset all the governors in the direction to eliminate the load speed error signal, means effective to disable the governing means below a predetermined value of load speed, and optionally operable means effective to disable the governing means;

and optionally operable means for each engine effective to disable the governor trim means of the engine.

5. A control system for a power plant including a plural number of gas-coupled gas turbine engines synchronously connected to drive a common variable load comprising, in combination, main power control means including a condition lever settable by an operator providing a power output level command signal, a load control lever settable by an operator providing a power output required signal, a gas generator governor for each engine operative to control fuel flow to the respective engine, and means generating a weighted sum of the said signals effective to vary concurrently the speed setting of the governors;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, governor trim means coupled to each governor effective to modify the speed setting of the governor, means responsive to the power error signal of each engine coupled to the governor trim means of the respective engine so as to reset the governor of each engine other than that generating the maximum power signal in the direction to eliminate the power error signal, and optionally operable means effective to disable the load sharing means;

governing means including means providing a load speed command signal, means responsive to load speed, and means operative to provide a load speed error signal, means responsive to the load speed error signal coupled to the governor trim means of all engines so as to reset all the governors in the direction to eliminate the load speed error signal, and optionally operable means effective to disable the governing means;

and optionally operable means for each engine effective to disable the governor trim means of the engine.

7. A control system for a power plant including a plural number of gas turbine engines synchronously connected to a variable pitch lifting rotor to drive the rotor comprising, in combination, main power control means including a condition lever settable by an operator providing a power output level command signal, a collective pitch control providing a rotor collective pitch signal, a fuel control for each engine operative to control fuel flow to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, and means responsive to the power error signal of each engine coupled to the power trim means of the respective engine so as to increase the power output of each engine other than that generating the maximum power signal in the direction to eliminate the power error signal;

and isochronous governing means including means providing a rotor speed command signal, means responsive to rotor speed, and means responsive to integrated rotor speed error operative to provide a rotor speed error signal, means responsive to the rotor speed error signal coupled to the power trim means of all engines so as to reset all the fuel controls in the direction to eliminate the rotor speed error signal.

8. A control system for a power plant including a plural number of gas turbine engines synchronously connected to a variable pitch lifting rotor to drive the rotor comprising, in combination, main power control means including a condition lever settable by an operator providing a power output level command signal, a collective pitch control providing a rotor collective pitch signal, a fuel control for each engine operative to control fuel flow to the respective engine, and means generating a weighted sum of the said signals effective to vary concurrently the power setting of the fuel controls;

load sharing means including means responsive to a condition indicative of the power output of each engine generating an engine power signal, comparing means effective to determine the maximum one of the said power signals, means operative to determine a power error signal for each engine representing the difference between the maximum power signal and the power signal of the said engine, power trim means coupled to each fuel control effective to modify the power setting of the fuel control, means responsive to the power error signal of each engine coupled to the power trim means of the respective engine so as to increase the power output of each engine other than that generating the maximum power signal in the direction to eliminate the power error signal, means effective to disable the load sharing means below a predetermined engine speed level, and optionally operable means effective to disable the load sharing means;

isochronous governing means including means providing a rotor speed command signal, means responsive to rotor speed, and means responsive to integrated rotor speed error operative to provide a rotor speed error signal, means responsive to the rotor speed error signal coupled to the power trim means of all engines so as to reset all the fuel controls in the direction to eliminate the rotor speed error signal, means effective to disable the isochronous governing means below a predetermined value of rotor speed, and optionally operable means effective to disable the isochronous governing means;

and optionally operable means for each engine effective to disable the power trim means of the engine.

9. A control system for a helicopter power plant including at least one gas turbine engine connected to drive a variable pitch lifting rotor comprising, in combination, main power control means including a condition control for each engine settable by an operator providing an engine power output level command signal, a rotor collective pitch control settable by an operator providing a rotor power input required signal, a governor for each engine operative to control fuel flow to the respective engine, and means generating a weighted sum of the said signals effective to vary concurrently the speed setting of each governor;

governor trim means coupled to each governor effective to modify the speed setting of the governor, rotor speed governing means including means providing a rotor speed command signal, means responsive to rotor speed, and means responsive to rotor speed error operative to provide a rotor speed error signal, means responsive to the rotor speed error signal coupled to each governor trim means so as to reset the governor in the direction to eliminate the rotor speed error signal, rotor acceleration control means including means effective to generate a rotor speed command limit signal rising progressively as a predetermined function of time; and select low gate means effective to transmit the lower one of the rotor speed command and rotor speed command limit signals to the rotor speed error responsive means during acceleration of the rotor from a predetermined speed.

10. A control system for a helicopter power plant including at least one gas turbine engine connected to drive a variable pitch lifting rotor comprising, in combination, main power control means including a condition control for each engine settable by an operator providing an engine power output level command signal, a rotor collective pitch control settable by an operator providing a rotor power input required signal, a governor for each engine operative to control fuel flow to the respective engine, and means generating a weighted sum of the said signals effective to vary concurrently the speed setting of each governor;

governor trim means coupled to each governor effective to modify the speed setting of the governor, rotor speed governing means including means providing a rotor speed command signal, means responsive to rotor speed, means responsive to rotor speed error operative to provide a rotor speed error signal, and means responsive to the rotor speed error signal coupled to each governor trim means so as to reset the governor in the direction to eliminate the rotor speed error signal, rotor acceleration control means including means effective to disable each governor trim means below a predetermined value of rotor speed, means energized in response to acceleration of rotor speed to the said predetermined value effective to generate a rotor speed command limit signal rising progressively from zero as a predetermined function of time; and select low gate means effective to transmit the lower one of the rotor speed command and rotor speed command limit signals to the rotor speed error responsive means.

* * * * *